United States Patent
Skrzynski et al.

(10) Patent No.: US 6,691,302 B1
(45) Date of Patent: Feb. 10, 2004

(54) INTERFACING A SERVICE COMPONENT TO A NATIVE API

(75) Inventors: Mark Skrzynski, Capitola, CA (US); Huy Ton, San Jose, CA (US)

(73) Assignee: Siemens Information & Communications Networks, Inc., Boca Raton, FL (US)

( * ) Notice: Subject to any disclaimer, the term of this patent is extended or adjusted under 35 U.S.C. 154(b) by 448 days.

(21) Appl. No.: 09/586,245

(22) Filed: May 31, 2000

(51) Int. Cl.$^7$ .................................................. G06F 9/44
(52) U.S. Cl. ........................ 717/118; 717/136; 717/148
(58) Field of Search ......................... 717/114–119, 136, 717/148; 703/23, 26, 27

(56) References Cited

U.S. PATENT DOCUMENTS

| | | | |
|---|---|---|---|
| 5,655,154 A | | 8/1997 | Jain et al. |
| 5,721,876 A | * | 2/1998 | Yu et al. ........................ 703/27 |
| 5,802,367 A | | 9/1998 | Held et al. |
| 5,907,701 A | | 5/1999 | Hanson |
| 5,987,517 A | | 11/1999 | Firth et al. |
| 6,014,666 A | | 1/2000 | Helland et al. |
| 6,185,609 B1 | * | 2/2001 | Rangarajan et al. ........ 709/219 |
| 6,229,537 B1 | * | 5/2001 | Sobeski et al. ............. 345/803 |
| 6,405,216 B1 | * | 6/2002 | Minnaert et al. ........ 707/104.1 |
| 6,496,865 B1 | * | 12/2002 | Sumsion et al. ............ 709/229 |

FOREIGN PATENT DOCUMENTS

| | | | |
|---|---|---|---|
| EP | 0371941 A2 | 6/1990 | |
| EP | 0770958 A1 | 2/1997 | |
| EP | 1 126 685 A2 | 8/2001 | |
| GB | 2 278 468 A | 11/1994 | |
| GB | 2354092 A * | 3/2001 | ........... G06F/17/30 |
| WO | WO 00/687790 A1 | 11/2000 | |

OTHER PUBLICATIONS

Friesen, Jeff, "The Win32–Java Hybrid", JavaWorld, Jul. 1999, p. 1–5.*

Friesen, Jeff, "Merging Java and Win32: A New Way to Develop Windows Applications", JavaWorld, Jul. 1998, p. 1–12.*

* cited by examiner

Primary Examiner—Todd Ingberg

(57) ABSTRACT

Systems and methods for interfacing a service component written in any one of a variety of programming languages to a native operating system application program interface (API) are described. For example, in one embodiment, a generic interface between the Win32 API (application program interface) and Windows NT service components written in C, C++, and JAVA is provided. In one aspect, an interface module is configured to load a service component written in a non-native programming language. In another aspect, an interface module is configured to retrieve service component information from a configuration database.

32 Claims, 3 Drawing Sheets

INTERFACING A SERVICE COMPONENT TO A NATIVE API

CROSS-REFERENCE TO RELATED APPLICATIONS

This application is related to U.S. application Ser. No. 09/586,557, filed on even date herewith, by Mark Skrzynski and Vijay K. Misra, and entitled "Hierarchical Dependability for Open Distributed Environments," which is incorporated herein by reference.

TECHNICAL FIELD

This invention relates to systems and methods for interfacing a service component to a native operating system application program interface (API).

BACKGROUND

A computer system typically includes an operating system that provides an environment in which one or more application programs may run. The operating system generally controls the operation of the computer system and the allocation of system resources. The operating system also exposes system services to the application programs, which, in turn, use these services to perform one or more computing tasks. In the Windows NT Server operating system, for example, a Win32 subsystem makes a 32-bit application programming interface (API) available to application programs. Typical operating system services include memory services, process creation services, and processing scheduling services.

Operating systems, such as the Windows NT Server operating system, make extensive use of dynamic link libraries. A dynamic link library (DLL) is a computer code module that contains functions to be linked with application code. A DLL may be loaded and linked to an application at run time, and may be unloaded when its functionality is no longer needed. A DLL usually consists of a set of autonomous functions that any application may use. In 32-bit Windows operating systems, such as Windows NT, Windows 95 and Windows CE, all of the functions in the Win32 API are contained in DLLs. Further details about the Win32 API may be found in "Advanced windows," Third Edition, Jeffrey Richter, Microsoft Press (1997), which is incorporated herein by reference.

In the 32-bit Windows environment, for an application (or another DLL) to call the system service functions of the Win32 API, the application must conform to a standard C-based interface. Accordingly, most service components operating in a 32-bit Windows environment are written in the C or C++ programming languages. In order to invoke the functionality of service components written in other programming languages, each component must provide its own customized operating environment in which the component may operate. For example, programs written in the JAVA programming language must operate in an environment provided by a JAVA virtual machine (JVM). The JVM is an abstract native computing machine that runs within an operating system to interpret and execute JAVA applications. Further details about the JVM may be obtained from "The Java™ Virtual machine Specification," Tim Lindholm and Frank Yellin, Addison Wesley (1997), which is incorporated herein by reference.

SUMMARY

The invention features systems and methods for interfacing a service component written in any one of a variety of programming languages to a native operating system application program interface (API). In one aspect, the invention features an interface module configured to load a service component written in a non-native programming language. In another aspect, the invention features an interface module configured to retrieve service component information from a configuration database.

Embodiments may include one or more of the following features.

The interface module preferably is configured to create an application operating environment in which the service component application is operable. For example, in one embodiment the interface module is configured to create a JAVA virtual machine for executing a service component application written in a JAVA programming language. The interface module preferably is configured to treat the application operating environment and the service component application as a single process during execution. In particular, the interface module preferably is configured to create an application thread on which to create the application operating environment. The interface module may be configured to create a main thread for monitoring and blocking the application thread.

The interface module preferably is configured to retrieve service component information from a configuration database. The interface module may be configured to retrieve from the configuration database the identity of a service component application to be executed. The interface module preferably is configured to load, run and control the identified service component application, and to obtain information about the run-time status of the component application.

The interface module preferably includes a service component interface dynamic link library (DLL). In one embodiment, the interface module is operable under the Windows NT Server operating system, and is configured to interface a Win32 API to service components written in C, C++ and JAVA programming languages.

Among the advantages of the invention are the following.

The invention provides a generic interface between a native operating system API and service components written in different programming languages (e.g., C, C++, and JAVA). By separating service functionality from other aspects of the system, the invention enables developers to create services more easily and with greater flexibility. Furthermore, services developed in accordance with the invention may be more easily maintained and tested because service maintenance and testing may be performed separately from other components of the system. For example, a dependability system implemented with services designed in accordance with the invention may be replaced or updated without modifying the underlying service modules. Furthermore, new services may be readily added to the system without changing the dependability system. For example, with the invention a system designer merely has to replace the appropriate DLL or JAVA class with a new service module that implements the desired functionality. The inventive use of the system configuration database (registry) enables system designers to readily implement service functionality with existing service modules regardless of the programming language used to create the service modules. The invention also enables developers to generate service modules without having to worry about the details of the native API interface.

Other features and advantages of the invention will become apparent from the following description, including the drawings and the claims.

DETAILED DESCRIPTION

Figure 1:
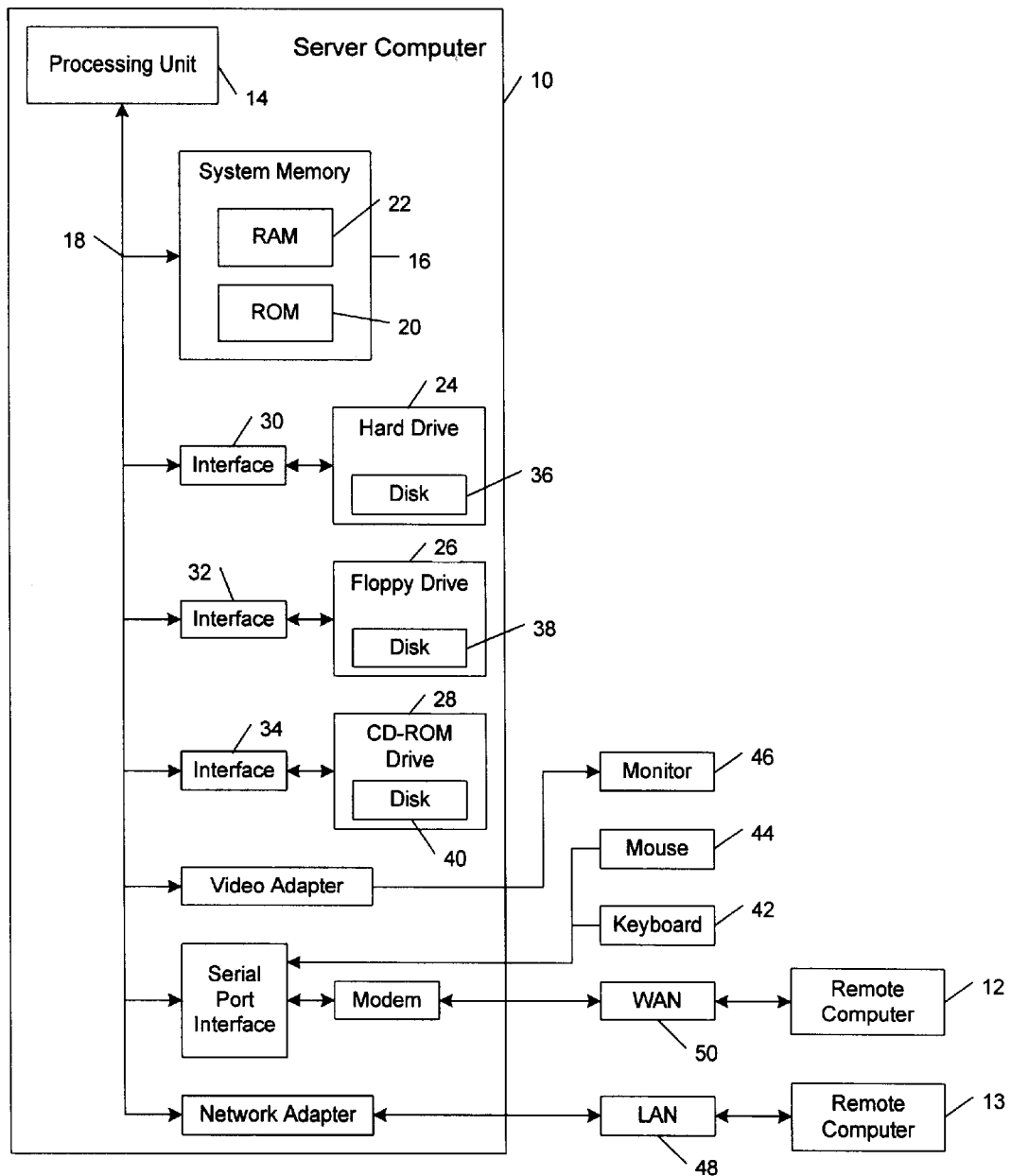
FIG. 1 is a block diagram of a computer network that includes a server computer and two remote computers.

Referring to FIG. 1, in one embodiment, the interface module of the invention may be implemented in a distributed computing environment that includes a server computer 10 and one or more remote computers 12, 13. Server computer 10 includes a processing unit 14, a system memory 16, and a system bus 18 that couples processing unit 14 to the various components of server computer 10. Processing unit 14 may include one or more processors, each of which may be in the form of any one of various commercially available processors. System memory 16 includes a read only memory (ROM) 20 that stores a basic input/output system (BIOS) containing start-up routines for server computer 10, and a random access memory (RAM) 22. System bus 18 may be a memory bus, a peripheral bus or a local bus, and may be compatible with any of a variety of bus protocols, including PCI, VESA, Microchannel, ISA, and EISA.

Server computer 10 also includes a hard drive 24, a floppy drive 26, and CD ROM drive 28 that are connected to system bus 18 by respective interfaces 30, 32, 34. Hard drive 24, floppy drive 26 and CD ROM drive 28 contain respective computer-readable media disks 36, 38, 40 that provide non-volatile storage for data, data structures and computer-executable instructions. Other computer-readable storage devices (e.g., magnetic tape drives, flash memory devices, and digital video disks) also may be used with server computer 10. A user may interact (e.g., enter commands or data) with server computer 10 using a keyboard 42 and a mouse 44. Other input devices (e.g., a microphone, joystick, or touch pad) also may be provided. Information may be displayed to the user on a monitor 46. Server computer 10 also may include peripheral output devices, such as speakers and a printer.

Remote computers 12, 13 may be workstations, server computers, routers, peer devices or other common network nodes. Remote computer 12 may be networked with server computer 10 over a local area network (LAN) 48, and remote computer 13 may be networked over a wide area network (WAN) 50 (e.g., the Internet).

Figure 2:
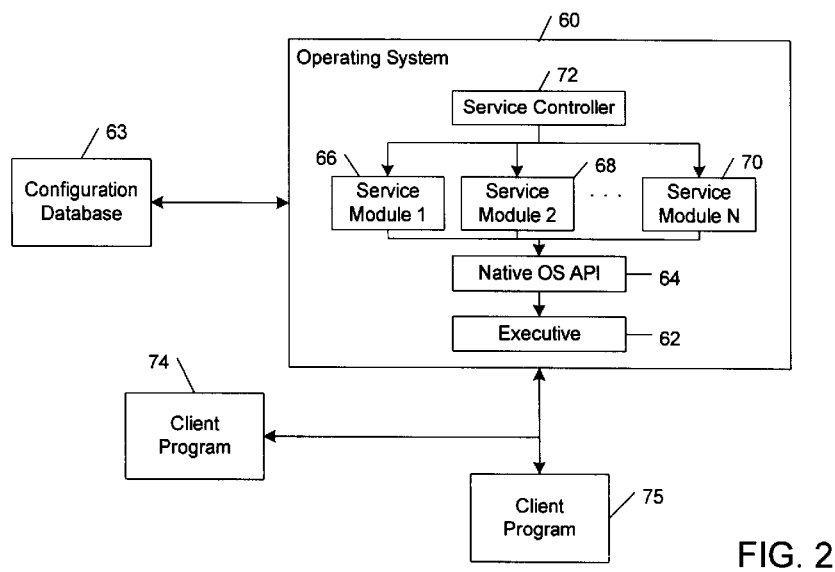
FIG. 2 is a block diagram of a service module execution environment provided by the server computer of FIG. 1.

Referring to FIG. 2, a number of program modules may be stored on storage drives 24–28 and in RAM 20, including an operating system 60 (e.g., the Windows NT Server operating system available from Microsoft Corporation of Redmond, Wash. U.S.A.), one or more application programs, and program data. Operating system 60 includes an executive 62 that provides the base operating system services (e.g., memory management, process and thread management, security, input/output, and interprocess communication) for creating a run-time execution environment on server computer 10. A configuration database (or registry) 63 contains the following information: parameters needed to boot and configure the system; system-wide software settings that control the operation of operating system 60; a security database; and per-user profile settings. A native operating system (OS) application programming interface (API) 64 exposes the base operating system services of executive 62 to user applications and to one or more service modules (or simply "services") 66, 68, 70. As used herein, the term "service" (or "service module") refers to a component of an operating system that provides a set of one or more functions. Service modules 66–70 are user-mode processes that may be configured to start automatically at system boot time without requiring an interactive logon; they also may be controlled dynamically during run-time. Service modules 66–70 call certain base operating system services (or functions) to interact with a service controller 72; such functions may include registering a successful start-up, responding to status requests, and pausing or shutting down the service. Service controller 72 starts, manages and directs operations within service modules 66–70. Service modules 66–70, on the other hand, create the environment in which one or more processes may operate and control the start-up, maintenance and termination of such processes. Typically, the run-time execution environment is installed on server computer 10, and one or more client programs 74, 75 operating on remote computers 12, 13 may access the functionality provided by service modules 66–70 over their respective network connections. In an alternative embodiment, the run-time execution environment may be installed on a single computer that hosts both service modules 66–70 and client programs 74, 75.

Before a service module 66–70 may operate in the run-time execution environment, it must be installed on server computer 10. A service module typically is installed by storing the service module in a data storage area that is accessible by server computer 10 (e.g., on disk 36 of in hard drive 24), and registering the attributes of the service module in configuration database 63. In one embodiment, each service 66–70 follows a standard procedure and implements a standard interface that allows the service to be monitored and controlled remotely. To this end, each service module includes an interface module that interfaces between the base operating system API and a service component that implements the functionality of the service. In particular, the interface module implements functions that enable the service module to be installed and maintained as a service. For example, in a system operating under Windows NT, the interface module must initialize a SERVICE TABLE ENTRY STRUCTURE. The interface module then calls a StartServiceCtrlDispatcher to register its sub-services and their entry point functions. When each service is started, its entry point function is called. The entry point function calls the RegisterServiceCtrlHandler function to register a control handler that allows the service to respond to control requests (e.g., Start Service, Stop Service, and Status Query) from service controller 72. The interface module also defines and handles certain dependability messages that enable the services to exchange status information and to control each other. Further details about the Windows NT operating system may be obtained from "Inside Windows NT," Second Edition, David A. Solomon, Microsoft Press (1998), which is incorporated herein by reference.

Figures 3A, 3B:
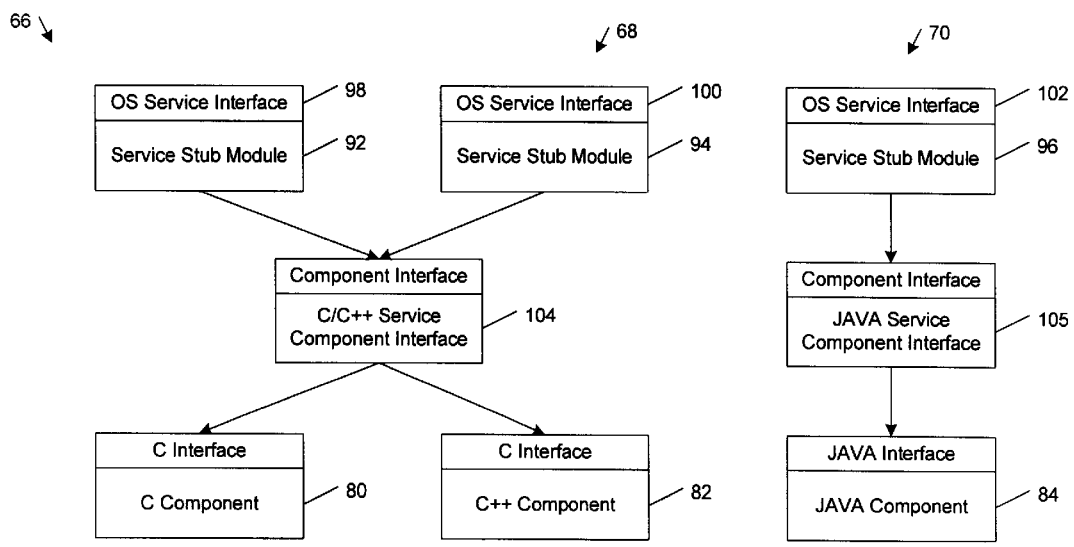
FIGS. 3A and 3B are diagrammatic views of service modules having service components written in the C/C++ and JAVA programming languages, respectively.

As shown in FIGS. 3A and 3B, the functionality of service modules 66–70 may be provided by respective service components 80, 82, 84 that are written in various programming languages (e.g., C, C++, and JAVA), at least one of which may be different from the programming language supported by the native operating system API 64. Each service component 80–84 has an associated interface module that loads and runs the associated service component 80–84 by providing the necessary entry function, and controls the associated service component by establishing a function that enables other processes to interact with the service component (e.g., by passing control codes, such as start, stop, shutdown). Each interface module includes a service stub module 92, 94, 96 that provides a respective interface 98, 100, 102 to the native operating system (OS) API 64 (e.g., the Win32 API for the Windows NT Server operating system), and a service component interface 104, 105 that loads, runs and controls the associated service component 80–84. Each service stub module 92–96 implements a ServiceMain function and includes a hard-coded service name that identifies the registry key for the service and the programming language used to implement the service functionality. In operation, the service stub modules 92–96 register service components 66–70 with operating system 60 as services, and load service component interfaces 104, 105. Service stub modules 92–96 may be written in C++ and may have the following form.

```
void MyServiceStart (DWORD argc, LPTSTR *argv)
{
    //Based on argv, I know what service I am,
    MyServiceName = GetMyServiceName (argc, argv);
    //Based on the service name, we know what registry
    //key contain our initialization database. Read
    //that database and initialize our data structures.
    MyDb = MyDatabaseRead (MyServiceName);
    if (MyDb.serviceType = JAVA_SERVICE)
    {
        //Load the service interface DLL.
        LoadJavaInterfaceDll();
    }
    else
        LoadCPlusPlussInterfaceDll();
    //Execute the interface DLL entry function.
    MyServiceInterfaceDllStart(MyServiceName);
}
```

Each service component programming language is supported by a respective service component interface 104, 105 (e.g., service component interface 104 supports service components written in C/C++, and service component interface 105 supports service components written in JAVA). In one embodiment, each service component interface executable 104 is implemented as a dynamic link library (DLL). In operation, service component interfaces 104, 105 read the name of the associated service components 80–84 from the service-specific area of configuration database 63 and load and run the identified service component 80–84 (e.g., initialize data, create queues, and handle control messages). Each service component interface 104, 105 is configured to load, run and control service components written in a respective programming language (e.g., C/C++ and JAVA). In the Windows NT operating environment, the native OS API (i.e., the Win32 API) is written in C/C++. Consequently, with respect to service components 80, 82 written in C/C++, service component interface 104 simply must call the appropriate entry function to load and run these services under Windows NT. Component interface 104 also provides call back functions that the service components 80, 82 may invoke as function calls. C/C++ service component interface 104 may be written in C++ and may have the following form.

```
//This is the entry point of the service "MyService"
void MyServiceInterfaceDllStart (char* MyServiceName)
{
    DWORD status;
    DWORD specificError;
        //Initialize the Status Structure.
    MyServiceStatus.dwServiceType     = SERVICE_WIN32;
    MyServiceStatus.dwCurrentState    = SERVICE_START_PENDING;
    MyServiceStatus.dwControlsAccepted = SERVICE_ACCEPT_STOP |
        SERVICE_ACCEPT_PAUSE_CONTINUE;
    MyServiceStatus.dwWin32ExitCode   = 0;
    MyServiceStatus.dwServiceSpecificExitCode = 0;
    MyServiceStatus.dwCheckPoint      = 0;
    MyServiceStatus.dwWaitHint        = 0;
        //Register the Controll Handler function where control messages
        //from SCM are sent.
    MyServiceStatusHandle = RegisterServiceCtrlHandler(
        TEXT(MyServiceName),
        MyServiceCtrlHandler);
    if(MyServiceStatusHandle == (SERVICE_STATUS_HANDLE)0)
    {
        //ReportError
        SysErrReport (errno);
        return;
    }
    // Initialization complete - report running status.
    MyServiceStatus.dwCurrentState   = SERVICE_RUNNING;
    MyServiceStatus.dwCheckPoint     = 0;
    MyServiceStatus.dwWaitHint       = 0;
    if (!SetServiceStatus (MyServiceStatusHandle, &MyServiceStatus))
    {
        status = GetLastError();
        //Report Error
        SysErrReport (status);
    }
        //Spawn my child thread which will execute the service
        //The argument to SpawnThread is the entry function
        //that is executed by the child thread
        SpawnThread (Child EntryFunction, MyServiceName);
        return
}
//This function handles all control messages sent from SCM.
//It relays these messages to the appropriate subtask, change
//the state of the state machine, and start a timer to wait for
//the response from the subtask. The state of the state machine
//transitions based on the response from the subtask (or
//time out event if no response comes back.
//Messages sent to each subtask are read when that subtask
//calls ReadAndHandleServiceQueue();
VOID MyServiceCtrlHandler (DWORD Opcode)
{
    DWORD status;
    switch(Opcode)
    {
        case SERVICE_CONTROL_PAUSE:
                //Send a Message to subtask to tell it to pause.
                Message2SubtaskSend(Opcode);
                //Start the timer to
                TimerStart (Opcode);
            break;
        case SERVICE_CONTROL_CONTINUE:
                //Handle in similar fashion as described above.
                break;
        case SERVICE_CONTROL_STOP:
                //Handle in similar fashion as described above.
                break;
        case SERVICE_CONTROL_INTERROGATE:
                //Handle in similar fashion as described above.
                break;
        default:
            SysErrReport (Opcode);
    }
        //Transition state machine
        StateMachineTransition (Opcode);
    // Send current status.
    if (!SetServiceStatus (MyServiceStatusHandle, &MyServiceStatus))
    {
        status = GetLastError();
        SysErrReport (status);
```

-continued

```
  }
  return;
}
DWORD ChildEntryFunction (char * MyServiceName)
{
  // Initialization code goes here.
  status = MyServiceInitialization(MyServiceName);
  // Handle error condition
  if (status != NO_ERROR)
  {
    MyServiceStatus.dwCurrentState    = SERVICE_STOPPED;
    MyServiceStatus.dwCheckPoint      = 0;
    MyServiceStatus.dwWaitHint        = 0;
    MyServiceStatus.dwWin32ExitCode   = status;
    MyServiceStatus.dwServiceSpecificExitCode = specificError;
    SetServiceStatus (MyServiceStatusHandle, &MyServiceStatus);
    return;
  }
      ServiceControlLoop();
}
// Stub initialization function.
DWORD MyServiceInitialization(DWORD argc, LPTSTR *argv,
  DWORD *specificError)
{
  argv;
  argc;
  specificError;
      //Based on the service name, we know what registry
      //key contain our initialization database. Read
      //that database and initialize our data structures.
      MyDb = MyDatabaseRead (MyServiceName);
      controllerMessageQueue = MessageQueueInit
      (MAX_MESSAGES);
      //Load the DLL that contains the service specific code.
      //The DLL has to implement a number of functions, For
      //example, it has to implement function ServiceStart,
      //ServiceStop, ServicePause, etc.
      LoadDll (MyDb.ServiceDll);
      return(0);
}
DWORD ServiceControlLoop ()
{
      while (1)
      {
            //Read control message from its queue. These
            //control messages are sent from the main task (i.e.
            //the one running MyServiceStart.
            //Each control message is interpreted and the DLL
            //functions (ServiceStart, ServiceStop, etc.) are called
            //appropriately.
            ReadAndHandleServiceQueue (subTaskQueue);
      }
}
```

With respect to service components requiring a different operating environment (e.g., JAVA service component 84), service component interface 105 treats the different operating environment (e.g., the JAVA virtual machine) and the process (e.g., the JAVA service component) running in that environment as a single process to provide a generic interface to the native OS API. For example, service component interface 105 loads a service component written in the JAVA programming language by first creating a JAVA virtual machine (JVM) and, subsequently, invoking the JAVA service component under the JVM. The JVM enables service component interface 105 to invoke methods and access the data members of the JAVA service component using javai.dll. A JAVA service component may load and implement a native method (e.g., a C++ DLL) that enables the service component interface to monitor changes in the status of the JAVA service component. JAVA service component interface 105 may be may be written in C++ and may have the following form.

```
void MyServiceInterfaceDllStart (char* MyServiceName)
{
    InitializeInterfaceDll();
    ...
}
void InitializeInterfaceDll()
{
        //Load javai.dll needed to create the java virtual machine.
        LoadDll (javai.dll);
        CreateJavaVirtualMachine();
}
```

Service component interface 105 also contains native "call back" methods, and a call to these native methods will return to the same service component interface even if the associated service component is written in JAVA because the JVM is created within the service component interface (i.e., the same context). In one embodiment, to avoid implementing a service component interface 105 for each service, a class CallBackClass is provided that declares all the native methods; all services that call into the service component interface call the native methods of the CallBackClass. This feature may be implemented in C++ as follows.

```
//This is a system wide class, which is used by all java services
//It provides a mechanism for any java service to call back into C/C++.
//without being restricted by the Java native call naming convention.
//Reminder: according the native naming convention, a native method
//ServiceNotify in class CallBackClass must be named
//CallBackClass_ServiceNotify in the JavaServiceDll. This is the reason
//why we cannot implement the native method in MyServiceClass.
//Doing so would mean that for each of the services X,Y,Z, would
//require us to implement a method X_ServiceNotify, Y_ServiceNotify,
//Z_ServiceNotify.
class CallBackClass
{
public:
    CallBackClass()
    {
        LoadDll (JavaIntervaceDll);
    }
    native ServiceNotify(integer status);
}
//Service specific class. Each service component must have its
//own class.
class MyServiceClass
{
    ServiceNotify(integer status)
    {
        CallBackClass.ServiceNotify(status);
    }
    ServiceStart()
    {
        //Start the service
        ...
    }
    ServiceStop ()
    {
        //Stop the service
    }
    ...
}
```

Figure 4:
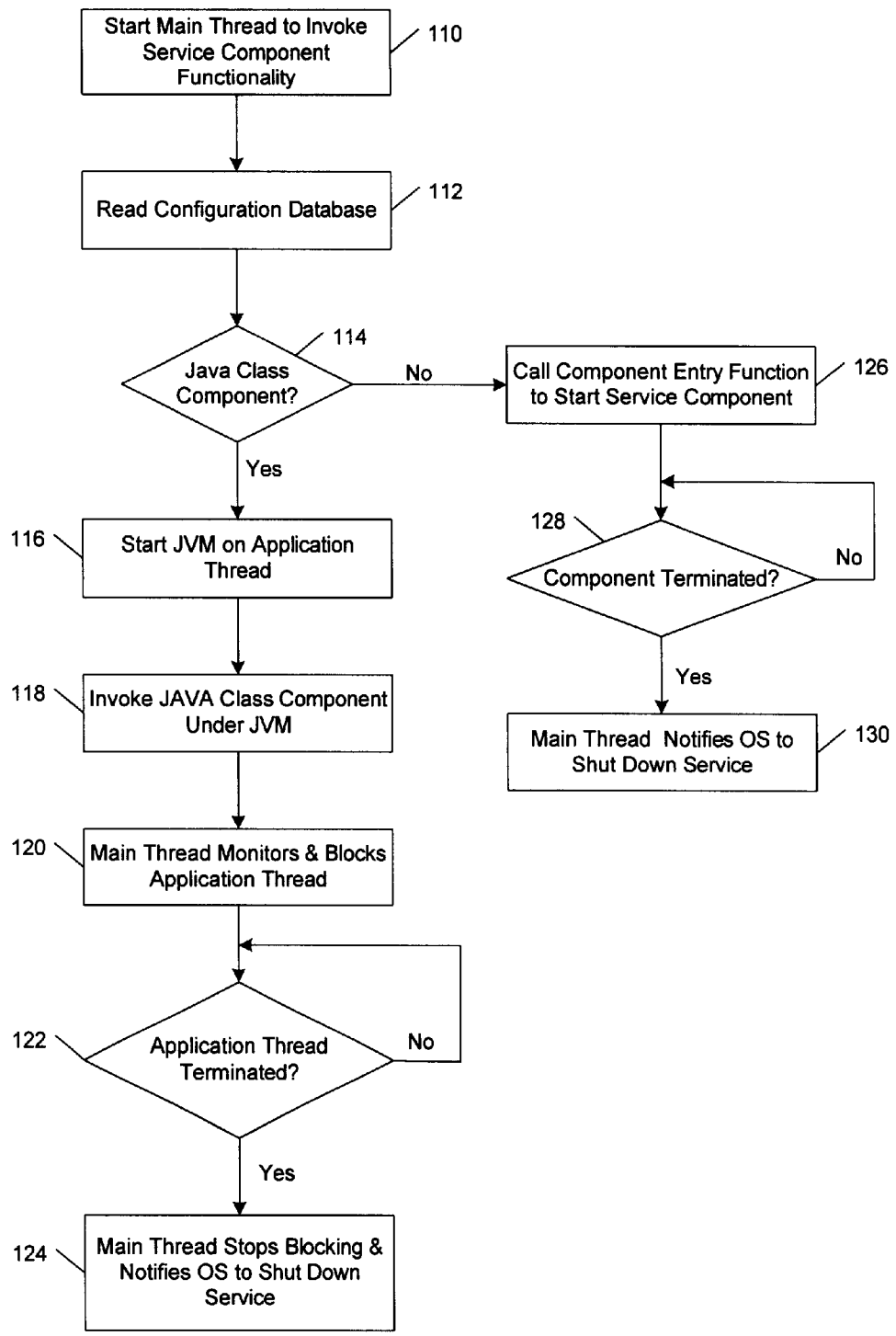
FIG. 4 is a flow diagram of a method of interfacing a service component to a native API.

Referring to FIG. 4, in one embodiment, service component interface 104, 105 may load, run and control a service component to implement the functionality of the service as follows. A main thread is started to invoke the service functionality (step 110). The service component interface 104, 105 reads the configuration database 63 to identify the location of the service component to be executed (step 112). If the service component is a JAVA class (step 114), the service component interface 105 creates a JVM on a second (application) thread (step 116). The JAVA class component is then invoked under the JVM (step 118). The entry class is designed to return only after the service component terminates. This feature facilitates detection and trapping of crashes and un-handled exceptions. While the JAVA class component is executing, the main thread monitors and blocks the application thread (step 120) until the application thread terminates. When the application thread terminates (step 122), the main thread comes out of blocking and notifies the native operating system to shut the service down (step 124). If the component is written in C/C++(step 114), the service component interface 104 calls the appropriate service component application and its entry function (both of which are identified in configuration database 63) to start the service component (step 126). After the service component terminates (step 128), the main thread notifies the operating system to shut down the service (step 130).

Service component interface 104, 105 may be configured to load, run and control service components complying with the JAVA native interface (JNI), the C/C++ Win32 interface, and any other operating environment that may be called from a dynamic link library.

In one embodiment, the service modules 66–70 may be used to implement a dependability system in a telephony-over-LAN (ToL) application, as described in U.S. patent application Ser. No. 09/586,557, filed on even date herewith, by Mark Skrzynski and Vijay K. Misra, and entitled "Hierarchical Dependability for Open Distributed Environments," which is incorporated herein by reference.

Other embodiments are within the scope of the claims. For example, although the above embodiments were described in the general context of computer-executable instructions of a computer program that runs on a server computer, these embodiments also may be implemented in combination with other program modules. In addition, these embodiments may be practiced with other computer system configurations, including single-processing unit or multi-processing unit computer systems, minicomputers, hand-held computing devices, processor-based or programmable consumer electronics, and the like. Furthermore, although the above embodiments were described in connection with a distributed computing environment in which tasks are performed by remote processing devices that are linked through a communications network, other embodiments may be practiced on stand-alone computer systems.

What is claimed is:

1. A system for interfacing a service component to a native operating system application program interface (API), wherein "service component" refers to a type of program that does not require interactive logon whenever running and that runs with facilitation by a service controller provided by the native operating system, the system comprising an interface module configured to load a service component written using a non-native programming language.

2. The system of claim 1, wherein the interface module is configured to create an application operating environment in which the service component application is operable.

3. The system of claim 2, wherein the interface module is configured to create a JAVA virtual machine for executing a service component application written in a JAVA programming language.

4. The system of claim 2, wherein the interface module is configured to treat the application operating environment and the service component application as a single process during execution.

5. The system of claim 4, wherein the interface module is configured to create an application thread on which to create the application operating environment.

6. The system of claim 5, wherein the interface module is configured to create a main thread for monitoring and blocking the application thread.

7. The system of claim 1, wherein the interface module is configured to retrieve service component information from a configuration database.

8. The system of claim 7, wherein the interface module is configured to retrieve from the configuration database the identity of a service component application to be executed.

9. The system of claim 8, wherein the interface module is configured to load, run and control the identified service component application.

10. The system of claim 7, wherein the interface module is configured to determine, based on said retrieved service component information, that said service component was written using said non-native programming language, and to create an operating environment that is appropriate for said non-native programming language, for running said service component.

11. The system of claim 1, wherein the interface module includes a service component interface dynamic link library (DLL).

12. The system of claim 1, wherein the interface module is operable under a Microsoft Windows Server operating system, and is configured to interface a Win32 API to service components written in C, C++ and JAVA programming languages.

13. A system for interfacing a service component to a native operating system application program interface (API), comprising an interface module configured to retrieve service component information from a configuration database.

14. The system of claim 13, wherein the interface module is configured to retrieve from the configuration database the identity of a service component application to be executed.

15. The system of claim 14, wherein the interface module is configured to load, run and control the identified service component application.

16. The system of claim 13, wherein the interface module includes a service component interface dynamic link library (DLL).

17. The system of claim 13, wherein the interface module is operable under a Microsoft Windows Server operating system, and is configured to interface a Win32 API to service components written in C, C++ and JAVA programming languages.

18. A method for interfacing a service component to a native operating system application program interface (API), wherein "service component" refers to a type of program that does not require interactive logon whenever running and that runs with facilitation by a service controller provided by the native operating system, the method comprising loading a service component written using a non-native programming language.

19. The method of claim 18, further comprising creating an application operating environment in which the service component application is operable.

20. The method of claim 19, wherein a JAVA virtual machine is created for executing a service component application written in a JAVA programming language.

21. The method of claim 19, wherein the application operating environment and the service component application are treated as a single process during execution.

22. The method of claim 21, further comprising creating an application thread on which to create the application operating environment.

23. The method of claim 22, further comprising creating a main thread for monitoring and blocking the application thread.

24. The method of claim 18, further comprising retrieving service component information from a configuration database.

25. The method of claim 24, wherein the identity of a service component application to be executed is retrieved from the configuration database.

26. The method of claim 25, further comprising loading, running and controlling the identified service component application.

27. The method of claim 25, further comprising determining a language of the service component application and creating an operating environment, that is appropriate for the determined language, for running the service component application.

28. The method of claim 18, wherein the service component is loaded by dynamic link library (DLL).

29. A method for interfacing a service component to a native operating system application program interface (API), comprising retrieving service component information from a configuration database.

30. The method of claim 29, wherein the identity of a service component application to be executed is retrieved from the configuration database.

31. The method of claim 30, further comprising loading, running and controlling the identified service component application.

32. The method of claim 29, wherein the service component is loaded by dynamic link library (DLL).

* * * * *